United States Patent
Onizuka et al.

(12) 
(10) Patent No.: US 6,190,630 B1
(45) Date of Patent: *Feb. 20, 2001

(54) FLUE GAS TREATING PROCESS AND APPARATUS

(75) Inventors: Masakazu Onizuka; Toru Takashina, both of Hiroshima; Kiyoshi Okazoe, Tokyo; Hiroyuki Katayama, Takasago, all of (JP)

(73) Assignee: Mitsubishi Heavy Industries, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/026,897

(22) Filed: Feb. 20, 1998

Related U.S. Application Data

(63) Continuation-in-part of application No. 08/803,520, filed on Feb. 20, 1997, now abandoned.

(30) Foreign Application Priority Data

Feb. 21, 1996 (JP) .................................................. 8-33434
Feb. 20, 1997 (JP) ................................................. 9-036156

(51) Int. Cl.[7] .................................................. C01B 17/20
(52) U.S. Cl. ................... 423/243.01; 422/168; 422/169; 422/171; 95/64; 95/70; 96/32; 96/52; 96/53
(58) Field of Search .................................. 422/168–171, 422/176; 96/32, 52, 53, 55; 95/64, 70; 423/242.2, 243.01, 244.01

(56) References Cited

U.S. PATENT DOCUMENTS

| | | | |
|---|---|---|---|
| 3,929,436 | * 12/1975 | Kim et al. ................................ | 96/51 |
| 4,364,910 | 12/1982 | Willett et al. ......................... | 423/242 |
| 4,441,897 | 4/1984 | Young et al. ............................ | 96/36 |
| 4,696,804 | 9/1987 | Shinoda et al. ....................... | 423/242 |
| 4,885,139 | 12/1989 | Sparks et al. ......................... | 422/169 |
| 5,173,867 | * 12/1992 | Johnston et al. ........................ | 96/32 |
| 5,246,680 | 9/1993 | Pikkujamsa ..................... | 423/244.07 |
| 5,427,608 | 6/1995 | Auer et al. ............................... | 95/65 |
| 5,470,556 | 11/1995 | Samish ............................ | 423/243.08 |

FOREIGN PATENT DOCUMENTS

| | | |
|---|---|---|
| 195 12 786 | 11/1995 | (DE) . |
| 0 244 346 | 11/1987 | (EP) . |
| 0 578 629 | 1/1994 | (EP) . |
| 121098 | 4/1987 | (TW) . |
| 95/33547 | 12/1995 | (WO) . |
| 96/17801 | 6/1996 | (WO) . |

OTHER PUBLICATIONS

Patent Abstracts of Japan, JP 09 285 718, Nov. 4, 1997.
Patent Abstracts of Japan, JP 08 252423, Oct. 1, 1996.

* cited by examiner

Primary Examiner—Hien Tran
(74) Attorney, Agent, or Firm—Foley & Lardner

(57) ABSTRACT

This invention provides a flue gas treating process for removing sulfur oxides and dust from exhaust gas containing sulfur oxides and dust by using an absorption tower into which an absorbing fluid containing an alkaline agent is sprayed, comprising the steps of equipping the absorption tower with integrally formed dust collection means comprising dust collecting plates and discharge electrodes, and with dust separation means for sweeping off the dust collected by the dust collection means; and treating the exhaust gas in the dust collection means and subsequently cleaning the exhaust gas in the absorption tower, whereby desulfurization and dust removal are effected while sweeping off the collected dust by the dust separation means. Thus, desulfurization and dust removal can be effected in a simple manner, and the capacity of an electrostatic precipitator installed on the upstream side can be reduced.

3 Claims, 5 Drawing Sheets

FLUE GAS TREATING PROCESS AND APPARATUS

This application is a continuation-in-part of application Ser. No. 08/803,520, filed Feb. 20, 1997, now abandoned.

FIELD OF THE INVENTION AND RELATED ART STATEMENT

This invention relates to a flue gas treating process for removing sulfur oxides and dust from exhaust gas discharged from a boiler or the like, and an apparatus therefor.

An example of a conventionally and commonly used process for removing sulfur oxides and dust from exhaust gas discharged from a boiler or the like is illustrated in FIG. 5. In FIG. 5, exhaust gas A discharged from a boiler or the like and containing sulfur oxides and dust is first introduced into a dry electrostatic precipitator 101, where dust is removed therefrom. Then, the exhaust gas A is generally treated in a wet desulfurization step using an absorption tower 102 in which the exhaust gas A is cleaned by bringing it into contact with an absorbing fluid B containing an alkaline agent C (e.g., limestone) that is held in a circulation tank 103, raised by means of a pump 104, and sprayed from a spray nozzle 105. Usually, most of the dust which was not collected in dry electrostatic precipitator 101, together with sulfur oxides, is removed in the wet desulfurization step, so that high overall dust-removing performance is achieved.

In recent years, with increasing attention to the problem of environmental protection, the concentration of dischargeable dust in exhaust gas tends to decrease. However, dry electrostatic precipitators are expensive equipment and, moreover, require a wide floor space. Consequently, it is desired to reduce the capacity of this equipment. However, since a reduction in the capacity of an electrostatic precipitator causes a loss in dust-removing performance, it is necessary to develop inexpensive and simple dust-removing equipment which can make up for such a loss in performance.

In view of the above-described circumstances of the prior art, it is an object of the present invention to provide a flue gas treating process which can achieve desulfurization and dust removal by use of simplified equipment and makes it possible to reduce the capacity of an electrostatic precipitator installed on the upstream side, as well as an apparatus therefor.

SUMMARY OF THE INVENTION

According to the present invention, there is provided a flue gas treating process for removing sulfur oxides and dust from exhaust gas containing sulfur oxides and dust by using an absorption tower into which an absorbing fluid containing an alkaline agent is sprayed, comprising the steps of equipping the absorption tower with integrally formed dust collection means having dust collecting plates and discharge electrodes, and with dust separation means for sweeping off the dust collected by the dust collection means; and treating the exhaust gas in the dust collection means and subsequently cleaning the exhaust gas in the absorption tower, whereby desulfurization and dust removal are effected while the collected dust is being swept off by said dust separation means.

According to the present invention, there is also provided a flue gas treating apparatus comprising an absorption tower for desulfurizing exhaust gas containing sulfur oxides and dust by bringing it into contact with an absorbing fluid containing an alkaline agent, a circulation tank disposed at the bottom of the absorption tower for holding the absorbing fluid, and spray means for spraying the absorbing fluid within the circulation tank into the absorption tower, characterized in that dust collection means having dust collecting plates and discharge electrodes is installed in the upper part of the absorption tower, and the dust collection means is equipped with dust separation means for sweeping off the dust collected by the dust collection means.

In one specific embodiment, the flue gas treating apparatus of the present invention comprises an absorption tower for desulfurizing exhaust gas containing sulfur oxides and dust by bringing it into contact with an absorbing fluid containing an alkaline agent, a circulation tank disposed at the bottom of the absorption tower for holding the absorbing fluid, and a circulating pump for raising the absorbing fluid from the circulation tank and spraying it into the absorption tower, and is characterized in that a simplified electrostatic precipitator having dust collecting plates and discharge electrodes is installed in the upper part of the absorption tower, and the simplified electrostatic precipitator is equipped with a high-voltage power supply for energizing the simplified electrostatic precipitator, and a hammering device for sweeping off the dust collected by the simplified electrostatic precipitator.

In the practice of the present invention, an absorption tower equipped with dust collection means at the inlet thereof is used as the absorption tower for effecting wet desulfurization, and dust is enlarged and washed out in the absorption tower to improve dust-removing performance in the absorption tower. This makes it possible to decrease the load imposed on a dry electrostatic precipitator or like device installed upstream of the dust collection means and, as a result, reduce the size of the dry electrostatic precipitator or like device.

DETAILED DESCRIPTION OF PREFERRED EMBODIMENTS

Figure 1:
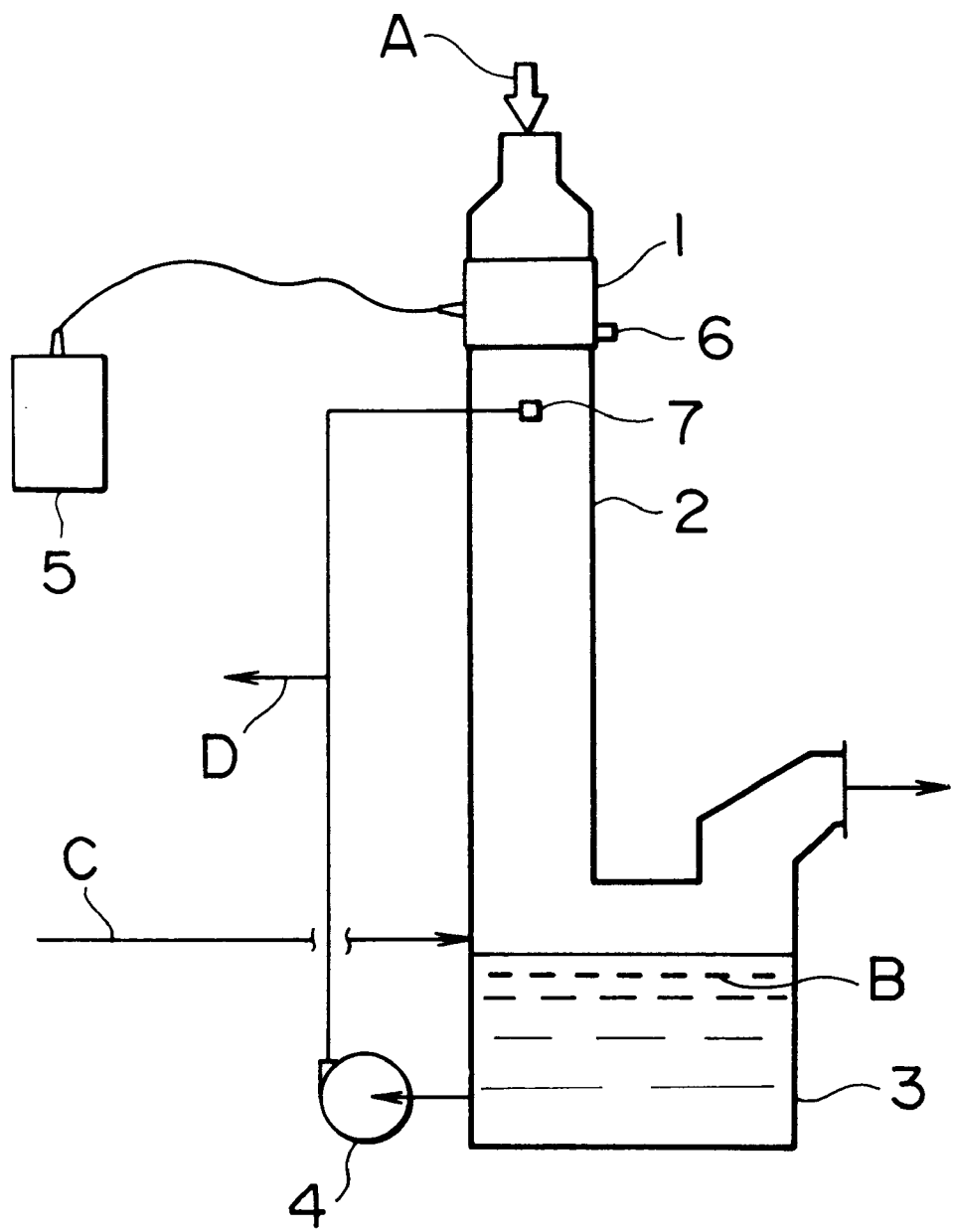
FIG. 1 is a schematic view illustrating an embodiment of the present invention.

FIG. 1 is a schematic view illustrating an embodiment of the present invention. The apparatus illustrated in FIG. 1 is a flue gas treating apparatus comprising an absorption tower 2 for desulfurizing exhaust gas containing sulfur oxides and dust by bringing it into contact with an absorbing fluid B containing an alkaline agent, a circulation tank 3 disposed at the bottom of absorption tower 2 for holding the absorbing fluid B, a circulating pump 4 for raising the absorbing fluid B from circulation tank 3 to absorption tower 2 and spraying it into absorption tower 2, and a spray nozzle 7 for spraying the absorbing fluid B. This apparatus is also equipped, in the upper part thereof, with dust collection means 1 for primarily capturing dust on dust collecting plates by electrostatic force, coarsening the captured dust by aggregation, sweeping off the dust intermittently, and thereby removing the dust easily in absorption tower 2, and also for imparting an electric charge to the dust passing therethrough so as to enhance dust-removing performance by utilization of the image charges of droplets in absorption tower 2; and dust separation means 6 for sweeping off the dust collected by dust collection means 1.

Figure 2:
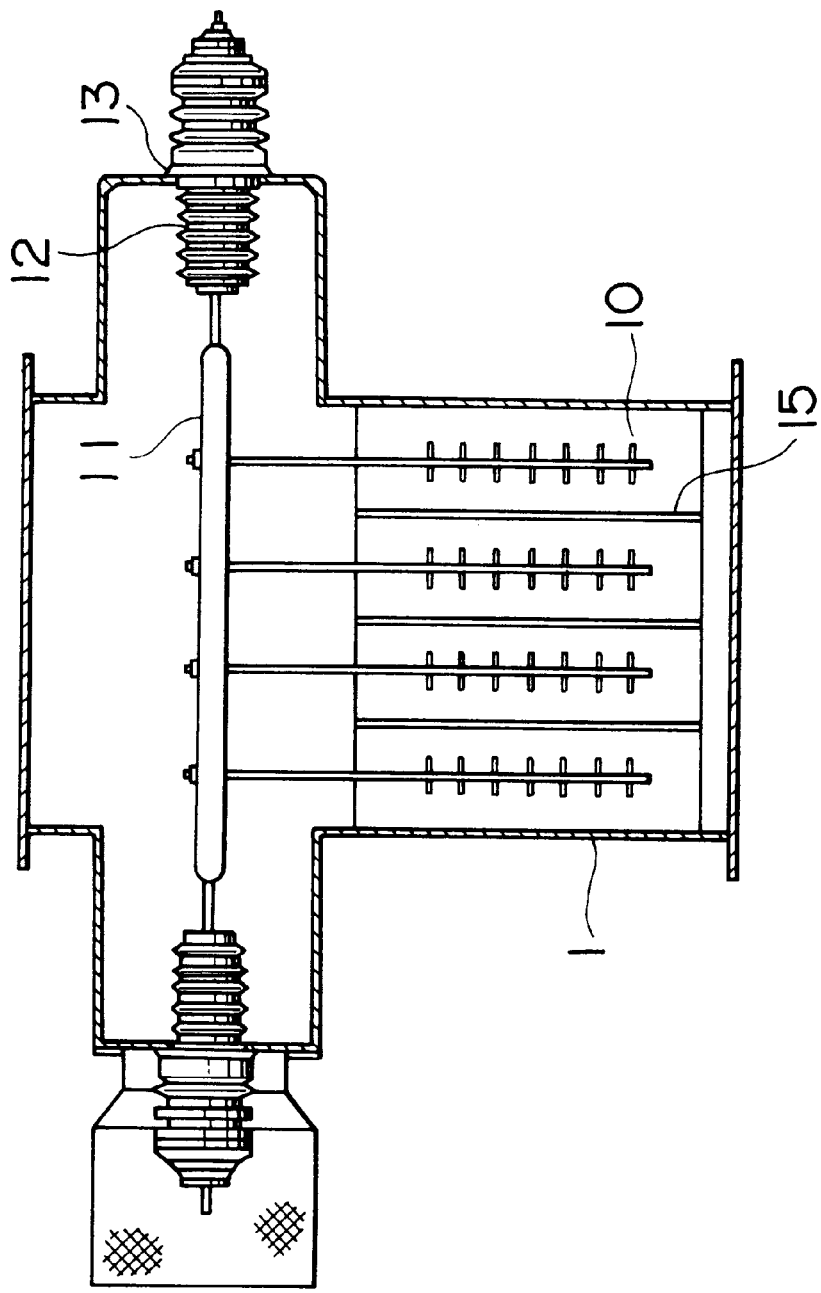
FIG. 2 is a vertical sectional view illustrating an example of the dust collection means used in the present invention.
Figure 3:
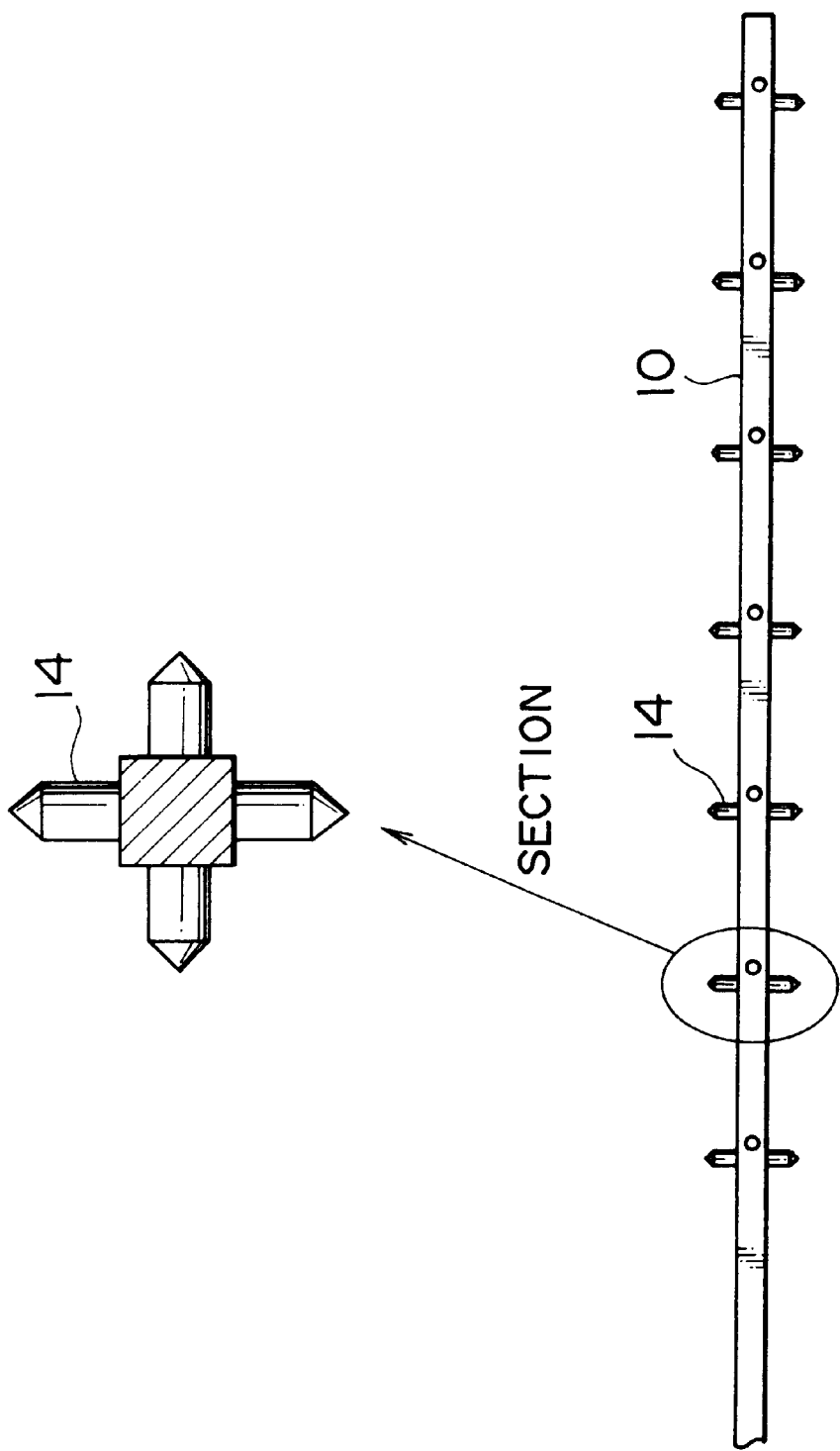
FIG. 3 is a schematic view illustrating an example of an electrode of the dust collection means used in the present invention.

FIG. 2 is a vertical sectional view illustrating an example of dust collection means 1 used in the present invention. In this dust collection means 1, an electrode supporting rod 11 is held by insulators 12 fixed to insulator mounting plates 13, and a plurality of discharge electrodes 10 are attached to this electrode supporting rod 11. Moreover, dust collecting plates 15 are disposed so as to be opposite to discharge electrodes 10. As an example of discharge electrode 10, a barbed discharge electrode 10 having cross-shaped barbs 14 is illustrated in FIG. 3.

The flue gas treatment in the apparatus of FIG. 1 is carried out, for example, in the following manner. First of all, exhaust gas A containing sulfur oxides and dust is treated in dust collection means 1 disposed in the upper part of absorption tower 2 and energized by high-voltage power supply 5. Then, in absorption tower 2, exhaust gas A is cooled, desulfurized and dedusted by contact with an absorbing fluid B containing an alkaline agent C which fluid is raised from circulation tank 3 by means of pump 4 and sprayed from spray nozzle 7. In this process, some of the dust present in exhaust gas A is attracted to and captured by dust collecting plates 15. Moreover, since the dust passing therethrough is electrically charged, the dust can be more efficiently removed in absorption tower 2 on the basis of electric attraction caused by the image charges of the droplets of the absorbing fluid B pumped up and sprayed into absorption tower 2.

The dust collected by dust collection means 1 is kept on dust collecting plates 15 for a sufficient period of time to coarsen the dust by primary aggregation. Then, the dust is intermittently swept off into absorption tower 2 by hammering dust collection means 1 with dust separation means 6 at regular intervals. Since the fallen dust is in the form of coarse particles, it can be easily removed by washing in absorption tower 2.

An alkaline agent C comprising limestone or the like is supplied to circulation tank 3 in a stoichiometric amount required for desulfurization, and waste liquor D is withdrawn in a stoichiometric amount corresponding to the amount of the desulfurization products. The dust captured in absorption tower 2 is contained in waste liquor D at a concentration balanced with the stoichiometric amount of the desulfurization products and discharged together with them.

According to the above-described construction, dust present in exhaust gas is collected by the dust collection means disposed at the upper inlet of the absorption tower, the collected dust is kept on the dust collecting plates for a sufficient period of time to coarsen the dust by primary aggregation, and the coarsened dust is intermittently swept off by hammering the dust collection means at regular intervals. Thus, the fallen dust enters the absorption tower in the form of coarse particles and can be easily removed by washing in the absorption tower. Moreover, the dust passing through the dust collection means is electrically charged thereby and can hence be efficiently removed on the basis of electric attraction caused by the image charges of the droplets of the absorbing fluid B pumped up and sprayed into the absorption tower. That is, the dust collection means is a device which has neither ash hopper nor ash conveyor and which can only be installed in a small space in the upper part of the absorption tower to perform the functions of coarsening dust and imparting an electric charge thereto and thereby enhance dust-removing performance in the absorption tower. This dust collection means makes it possible to reduce the capacity of a dry electrostatic precipitator installed on the upstream side of the absorption tower and thereby bring about a marked cutdown in equipment cost.

EXAMPLE

An exhaust gas treating test was carried out by using an apparatus having the construction illustrated in FIG. 1. In this test, a simplified electrostatic precipitator 1 having a horizontal size of 60 cm×60 cm and a height of about 1 m was used as the dust collection means. In FIG. 1, exhaust gas A having a flow rate of 10,000 $m^3N$ per hour was passed through simplified electrostatic precipitator 1 to collect dust present therein. Subsequently, exhaust gas A was cooled, desulfurized and dedusted in an absorption tower 2 having a horizontal size of 70 cm×70 cm and a height of 7 m.

The properties of exhaust gas A passed through simplified electrostatic precipitator 1 were as shown in Table 1.

TABLE 1

Inlet gas flow rate: 10,000 $m^3N/h$
Gas temperature: 90° C.
$SO_x$ concentration: 900 ppm
Dust concentration: 60–70 $mg/m^3N$ Simplified electrostatic precipitator 1 for collecting dust from exhaust gas A was energized by a high-voltage power supply 5 and intermittently hammered with a hammering device 6 used as the dust separation means. The dust swept off from simplified electrostatic precipitator 1 by hammering was treated in absorption tower 2 together with exhaust gas A. The operating conditions of simplified electrostatic precipitator 1 were as shown in Table 2.

TABLE 2

Voltage: 37 kV
Current: 15 mA
Hammering intervals: 4 hours
Hammering time: 5 minutes After being treated by simplified electrostatic precipitator 1, exhaust gas A was passed through absorption tower 2 where it was cooled, desulfurized and dedusted by gas-liquid contact with an absorbing fluid B which was raised from a circulation tank 3 by means of a pump 4 at a flow rate of 200 $m^3$ per hour and sprayed into absorption tower 2. An alkaline agent C comprising limestone was supplied to circulation tank 3 in a stoichiometric amount required for desulfurization, and waste liquor D was withdrawn in a stoichiometric amount corresponding to the amount of the desulfurization products. The dust captured in absorption tower 2 was contained in waste liquor D at a concentration balanced with the stoichiometric amount of the desulfurization products and discharged together with them. The temperature, $SO_x$ concentration and dust concentration of the exhaust gas cooled, desulfurized and dedusted in absorption tower 2 were as shown in Table 3.

TABLE 3

Figure 4:
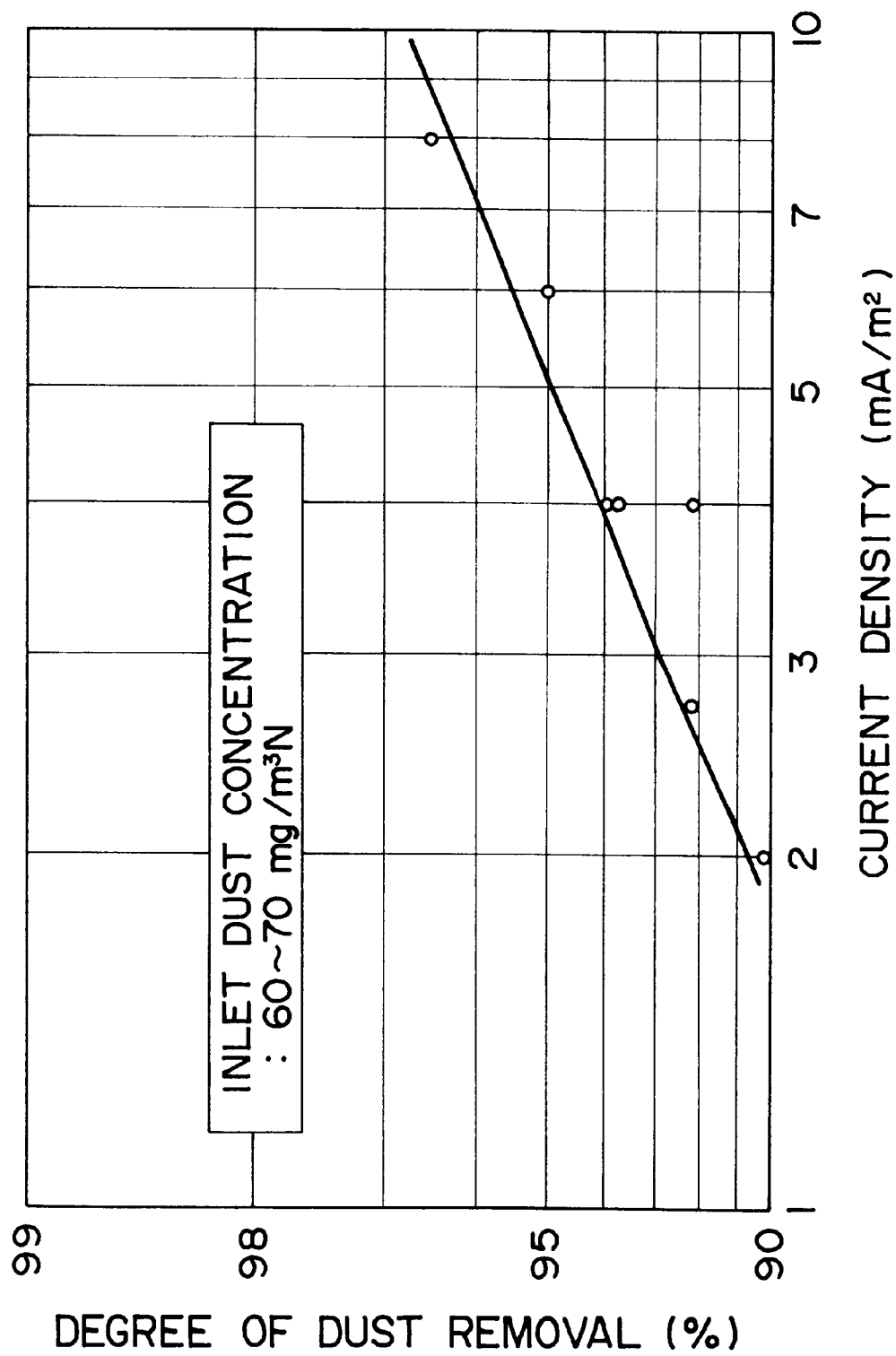
FIG. 4 is a graph showing the results obtained by measuring dust-removing performance in the Example of the present invention while varying the applied current.
Figure 5:
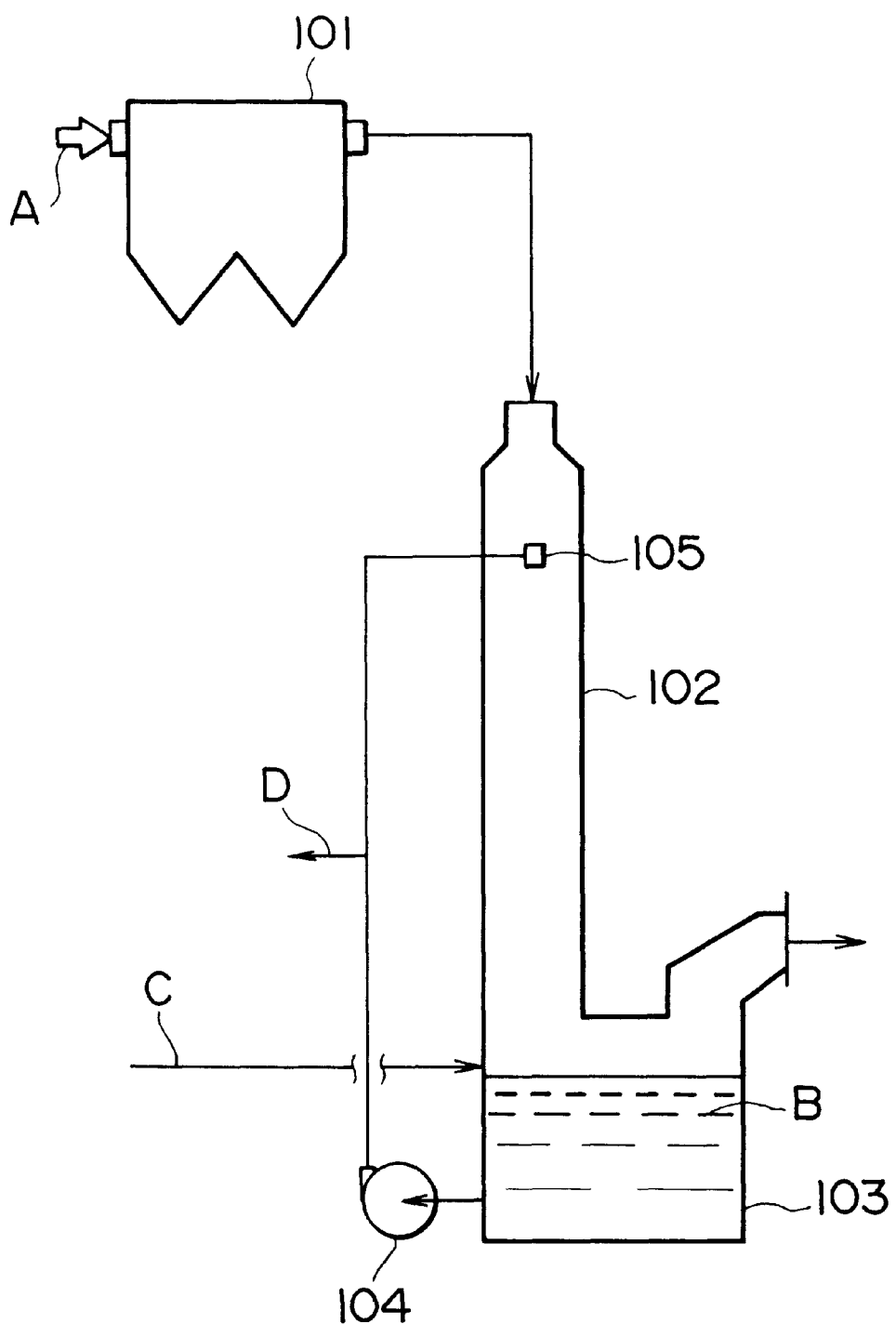
FIG. 5 is a schematic view illustrating an example of a conventional flue gas treating process.

Gas temperature: 48° C.
SO$_x$ concentration: 65–70 ppm
Dust concentration: 4.5–5 mg/m$^3$N Simplified electrostatic precipitator 1 used in the above-described test had the construction shown in the vertical sectional view of FIG. 2. In this precipitator 1, a total of 16 barbed discharge electrodes 10 as illustrated in FIG. 3 were used. In each discharge electrode 10, seven sets of barbs arranged in a cross were disposed at intervals of 50 mm in the direction of flow of the gas, and the effective dust collecting length thereof was 350 mm. FIG. 4 shows the results obtained by measuring the dust-removing performance of simplified electrostatic precipitator 1 while varying the current density applied thereto. In FIG. 4, the current density on the abscissa is a value obtained by dividing the applied current by the effective dust collecting area of dust collecting plates 15 which was assumed to be 3.7 m$^2$.

It can be seen from the results of the above-described example that the dust concentration at the inlet of absorption tower 2 can be increased by equipping the inlet of absorption tower 2 with simplified electrostatic precipitator 1 and, in consequence, the size of a dust collector installed upstream of simplified electrostatic precipitator 1 can be reduced. A more detailed explanation is offered on this point. Generally, a measure of the performance of an electrostatic precipitator is given by the following equation.

$$\eta = 1 - \exp\left(-\frac{vA}{Q}\right)$$

where
- η: Degree of dust removal
- v: Traveling speed of dust particles (m/sec)
- A: Dust collecting area (m$^2$)
- Q: flow rate of gas (m$^3$/sec)

For example, when the dust concentration at the inlet of a dry electrostatic precipitator installed upstream of a desulfurizer is 1 g/m$^3$N, it has been required in the prior art to reduce the dust concentration at the outlet of the dry electrostatic precipitator (i.e., at the inlet of the desulfurizer) to 30 mg/m$^3$N. However, by using the apparatus of the present invention, exhaust gas can be treated even at a dust concentration of as high as 70 mg/m$^3$N. Then, on the assumption that v=0.2 m/sec and Q=500 m$^3$/sec, a dust collecting area of about 8,800 m$^2$ has been required in the prior art, but the present invention makes it possible to decrease the dust collecting area to about 6,700 M$^2$. This corresponds to an about 30% reduction in size.

What is claimed is:

1. A flue gas treating apparatus, comprising:
   (i) an absorption tower for desulfurizing exhaust gas containing sulfur oxides and dust,
   (ii) a circulation tank for holding an absorbing fluid comprising an alkaline agent, wherein the circulation tank is disposed at the bottom of the absorption tower,
   (iii) a dry dust collection means comprising dust collection plates, discharge electrodes and dust separation means for dislodging off dust collected by the dust collection means, wherein said dust collection means is installed in an upper, upstream part within the absorption tower; and
   (iv) a spray means for spraying the absorbing fluid into the absorption tower, wherein said spray means is located downstream of said dust collection means.

2. A flue gas treating apparatus, comprising:
   (i) an absorption tower for desulfurizing exhaust gas containing sulfur oxides and dust;
   (ii) a circulation tank for holding an absorbing fluid comprising an alkaline agent, wherein the circulation tank is disposed that the bottom of the absorption tower;
   (iii) a circulating pump for raising the absorbing fluid from the circulation tank and spraying it into said absorption tower;
   (iv) a dry electrostatic precipitator comprising dust collecting plates, discharge electrodes and a hammering device for dislodging off the dust collected by the electrostatic precipitator, wherein the electrostatic precipitator is equipped with a power supply for energizing the electrostatic precipitator and wherein the electrostatic precipitator is installed in the upper, upstream part within said absorption tower;
   (v) a spray means for spraying the absorbing fluid into the absorption tower, wherein said spray means is located downstream of said dry electrostatic precipitator.

3. A process for removing sulfur oxides and dust from an exhaust gas, comprising:
   introducing an exhaust gas containing sulfur oxides and dust into a dry dust collection means, said dry dust collection means comprising dust collecting plates, discharge electrodes and dust separation means for dislodging off the dust collected by said dust collection means, wherein said dry dust collection means is installed in an upper, upstream part within an absorption tower, and
   subsequently spraying the gas and dislodged dust with an absorbing fluid comprising an alkaline agent.

* * * * *